United States Patent

Matsuura et al.

Patent Number: 5,283,509
Date of Patent: Feb. 1, 1994

[54] TRACING CONTROL SYSTEM

[75] Inventors: Hitoshi Matsuura, Hachioji; Hitoshi Aramaki, Hino, both of Japan

[73] Assignee: Fanuc Ltd., Yamanashi, Japan

[21] Appl. No.: 873,618

[22] PCT Filed: Apr. 7, 1990

[86] PCT No.: PCT/JP90/00478

§ 371 Date: Dec. 3, 1990

§ 102(e) Date: Dec. 3, 1990

[87] PCT Pub. No.: WO90/11869

PCT Pub. Date: Oct. 18, 1990

Related U.S. Application Data

[63] Continuation of Ser. No. 613,890, Dec. 3, 1990, abandoned.

[30] Foreign Application Priority Data

Apr. 12, 1989 [JP] Japan .................. 1-92752

[51] Int. Cl.⁵ .................. B23Q 35/12; G05B 19/33
[52] U.S. Cl. .................. 318/577; 318/578; 364/474.03; 364/474.35
[58] Field of Search .................. 318/560–640; 364/474.01–474.32

[56] References Cited

U.S. PATENT DOCUMENTS

| 4,224,670 | 9/1980 | Yamazaki | 318/571 X |
| 4,330,832 | 5/1982 | Kohzai et al. | 318/571 |
| 4,396,832 | 8/1983 | Henderson | 318/577 X |
| 4,426,180 | 1/1984 | Imazeki et al. | 318/571 |
| 4,575,665 | 3/1986 | Matsuura et al. | 318/578 |
| 4,646,225 | 2/1987 | Matsuura | 318/571 X |
| 4,654,570 | 3/1987 | Yamazaki | 318/578 |
| 4,688,179 | 8/1987 | Yamazaki | 318/571 |
| 4,709,198 | 11/1987 | Ogo et al. | 318/571 |
| 4,746,251 | 5/1988 | Yoshikawa et al. | 318/578 X |
| 4,814,998 | 3/1989 | Aramaki | 318/603 X |
| 4,949,025 | 8/1990 | Iwagaya et al. | 318/569 |
| 4,962,460 | 10/1990 | Matsuura | 318/578 X |
| 5,015,130 | 5/1991 | Matsuura et al. | 318/578 |

FOREIGN PATENT DOCUMENTS 0214584 3/1987 European Pat. Off. .

OTHER PUBLICATIONS

Supplementary European Search Report, The Hague, search issued Aug. 14, 1992.

Primary Examiner—Paul Ip
Attorney, Agent, or Firm—Staas & Halsey

[57] ABSTRACT

A tracing control system machines a workpiece to a desired contour corresponding to the surface of a model which is being traced. The tracing control system comprises a tracing control circuit, a digitizing circuit, and numerical circuits. The tracing control circuit controls a plurality of tracing axes to trace the surface of the model. The digitizing circuit is connected to the tracing control circuit through a bus, for reading the positions of the tracing axes as positional data from time to time and processing the positional data to prevent a cutter head from biting into the workpiece, thereby to generate NC data linearly approximate the surface of the model. The numerical control circuits are connected to the digitizing circuit through the bus, for positionally controlling as many machining axes as the number of the tracing axes on the NC data to machine the workpiece.

2 Claims, 2 Drawing Sheets

TRACING CONTROL SYSTEM

This application is a continuation of application Ser. No. 07/613,890, filed Dec. 3, 1990, now abandoned.

TECHNICAL FIELD

The present invention relates to a tracing control system for machining a workpiece to a desired contour corresponding to the surface of a model which is being traced, and more particularly to a tracing control system for machining a workpiece to a contour according to the traced shape of a model at high speed and with high precision based on on-line data processing.

BACKGROUND ART

FIG. 2 of the accompanying drawings shows the concept of a conventional tracing control system. A stylus 142 is held in contact with a model 143 to be copied. Amounts $\epsilon x$, $\epsilon y$, $\epsilon z$ of displacement of the stylus 142 along respective axes are detected by a tracer head 141. A combined amount $$\epsilon(\epsilon = \sqrt{\epsilon x^2 + \epsilon y^2 + \epsilon z^2})$$

of displacement of the stylus 142 is calculated by a combining circuit 131. An adder 132 then calculates the difference $\Delta\epsilon$ between the combined amount $\epsilon$ of displacement a reference amount $\epsilon 0$ of displacement and a normal-direction speed signal generator 133 produces a normal-direction speed signal Vn by multiplying the difference $\Delta\epsilon$ by a predetermined gain. A tangential-direction speed signal generator 134 generates a tangential-direction speed Vt from the difference $\Delta\epsilon$ and a commanded tracing speed.

A switching circuit 135 selects amounts of displacement along the respective axes in a commanded tracing plane. A tracing-direction calculating circuit 136 employs the selected amounts to calculate a cosine $\cos \theta$ and a sine $\sin \theta$ of a profiling direction $\theta$. An axis speed signal generator 137 employs Vn, Vt, $\cos \theta$, and $\sin \theta$ to generate axis speed signals Vx, Vy, Vz for the respective tracing axes. Based on the axis speed signals, the stylus 142 is moved on the surface of the model 143. A cutter head 162 is also moved at the same speed as the stylus 142 to machining a workpiece 163.

In the conventional tracing control system, however, there is a certain limitation on tracing speeds. If the tracing speed is excessively high, the cutter head 162 tends to bite into the workpiece 163 in regions where the shape to be copied abruptly changes.

There has been developed a digitizer as a means for solving the above problem. The digitizer reads digital positional data of the positions of the controlled axes from time to time. The digitizer linearly approximates the model surface based on the positional data, and also processes data to prevent the cutter head from biting into the workpiece, such as by temporarily interrupting the reading of positional data in the regions where the shape to be copied abruptly changes, thereby generating NC data. The NC data are then supplied to a computerized numerical control system for machining the workpiece.

The process which employs the digitizer, however, requires an increased number of steps and is not efficient since the model is traced and then the workpiece is machined.

DISCLOSURE OF THE INVENTION

The present invention has been made in view of the aforesaid drawbacks. It is an object of the present invention to provide a tracing control system for machining a workpiece to a contour according to the traced shape of a model at high speed and with high precision based on on-line data processing.

To achieve the above object, there is provided in accordance with the present invention a tracing control system for machining a workpiece to a desired contour corresponding to the surface of a model which is being traced, comprising a tracing control circuit for controlling a plurality of tracing axes to trace the surface of the model, a digitizing circuit connected to the tracing control circuit through a bus, for reading the positions of the tracing axes as positional data from time to time and processing the positional data to prevent a cutter head from biting into the workpiece, thereby to generate NC data which linearly approximate the surface of the model, and numerical control circuits connected to the digitizing circuit through the bus, for positionally controlling as many machining axes as the number of the tracing axes based on the NC data.

The tracing control circuit, the digitizing circuit, and the numerical control circuits are functionally coupled to each other through the single bus. While the model to be copied is being traced under the control of the tracing control circuit, the NC data are generated by the digitizing circuit with unwanted data eliminated, and the numerical control circuits control the machining axes in position according to the NC data.

BEST MODE FOR CARRYING OUT THE INVENTION

An embodiment of the present invention will hereinafter be described with reference to the drawings.

Figure 1:
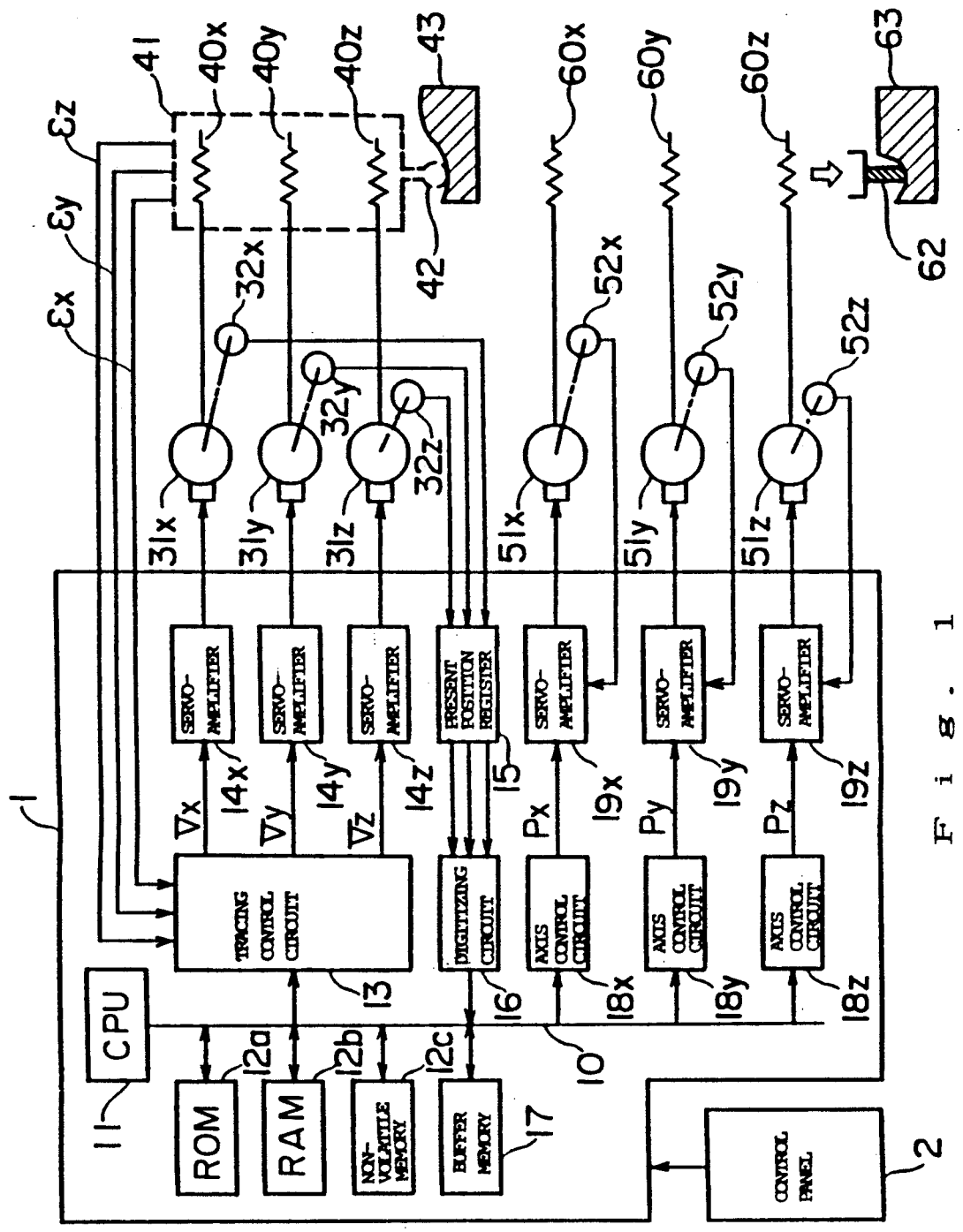
FIG. 1 is a block diagram showing the hardware arrangement of a tracing control system according to an embodiment of the present invention.
Figure 2:
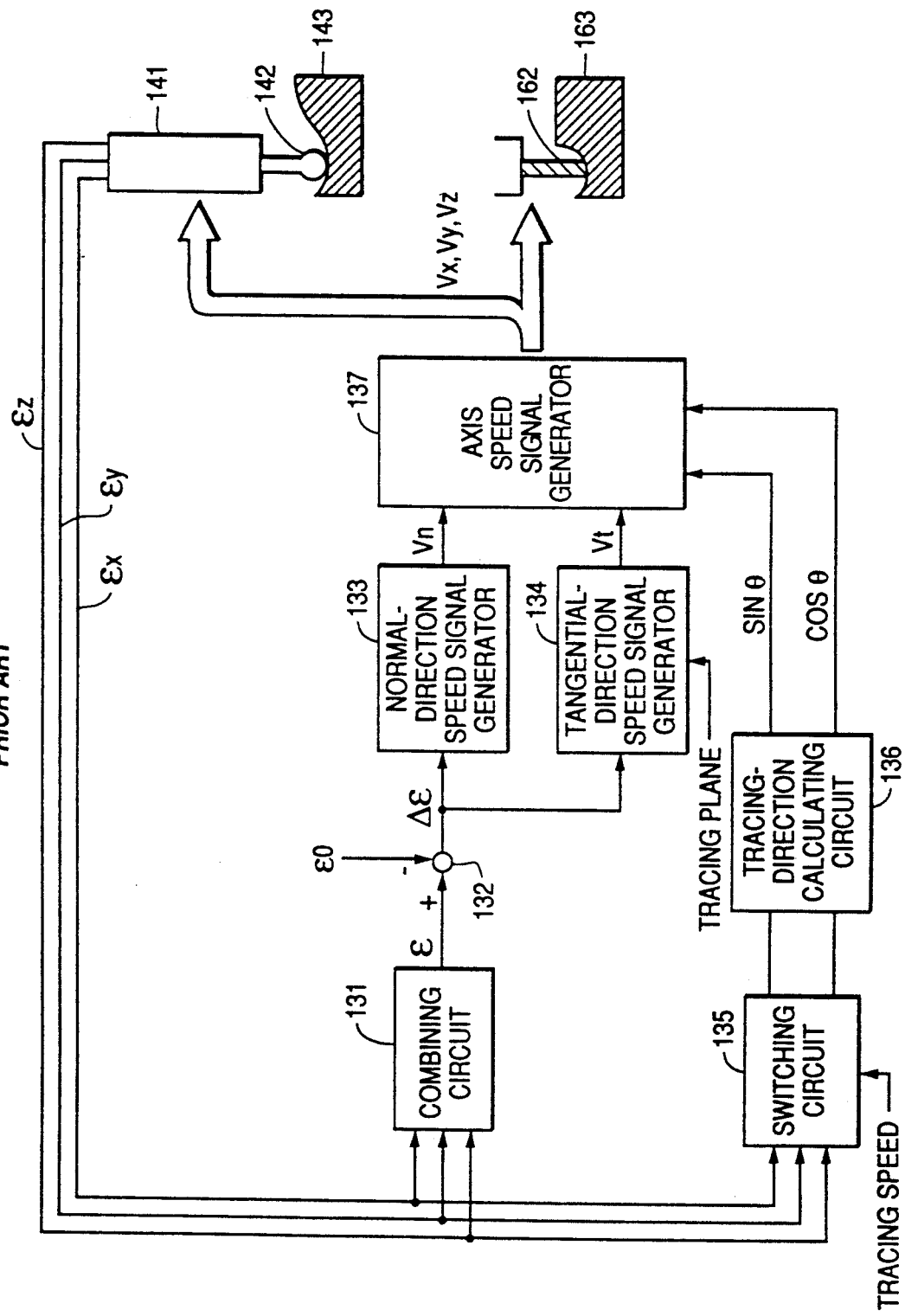
FIG. 2 is a diagram showing the concept of a conventional tracing control system.

FIG. 1 is a block diagram showing the hardware arrangement of a tracing control system according to an embodiment of the present invention. In FIG. 1, a processor 11 reads a system program stored in a ROM 12a through a bus 10, and controls the overall operation of a tracing control system 1 according to the system program. A RAM 12b comprises a DRAM for temporarily storing calculated data and display data. A nonvolatile memory 12c is backed up by a battery (not shown), and stores various parameters required by tracing control, digitizing, and numerical control. These parameters are entered from a control panel 2.

A tracing control circuit 13 is supplied with amounts $\epsilon x$, $\epsilon y$, $\epsilon z$ of displacement along respective axes of a stylus 42, and also with a tracing plane, a tracing speed, etc., from the processor 11 through the bus 10, for generating speed signals Vx, Vy, Vz for respective tracing axes 40x, 40y, 40z according to the known process. Servoamplifiers 14x, 14y, 14z amplify the speed signals Vx, Vy, Vz and energize servomotors 31x, 31y, 31z mounted on a tracing machine with the amplified speed signals, thereby moving a tracer head 41 along the surface of a model 43 for carrying out a tracing control process.

Pulse coders 32x, 32y, and 32z generate pulse signals each time the servomotors 32x, 31y, 31z rotate through a predetermined angle. A present position register 15 in the tracing control system 1 reversibly counts the pulse signals from the pulse coders 32x, 32y, 32z thereby to store the present positions of the tracing axes 40x, 40y, 40z, and supplies the stored present positions as positional data to a digitizing circuit 16.

The digitizing circuit 16 reads the positional data at predetermined time intervals or when a variation in the positional data exceeds a predetermined tolerable value, and generates NC data which linearly approximate the configuration of the model 43. The digitizing circuit 16 corrects an error of a path due to displacement of the stylus 41 when the NC data are generated. If the positional data vary in excess of a predetermined value, then the digitizing circuit 16 regards such a variation in the positional data as indicating an abrupt shape-changing region, and temporarily interrupts the reading of the positional data. Moreover, the digitizing circuit 16 is responsive to commands for scaling the positional data at a given magnification ratio, converting the unit of the positional data, and rotating the coordinates of the positional data. The NC data thus produced by the digitizing circuit 16 are stored into a buffer memory 17 through the bus 10.

The processor 11 successively reads the NC data stored in the buffer memory 17, and applies the data as movement commands for machining axes 60x, 60y, 60z to axis control circuits 18x, 18y, 18z through the bus 10. The axis control circuits 18x, 18y, 18z convert the applied NC data into position command signals Px, Py, Pz, which are applied to respective servoamplifiers 19x, 19y, 19z. The servo-amplifiers 19x, 19y, 19z amplify the position command signals Px, Py, Pz to energize respective servomotors 51x, 51y, 51z.

The servomotors 51x, 51y, 51z have built-in position-detecting pulse coders 52x, 52y, 52z which feed positional signals as pulse trains back to the servo-amplifiers 19x, 197, 19z. Although not shown, the servo-amplifiers 19x, 19y, 19z convert the pulse trains into speeds through F/V (frequency/speed) conversion, thereby generating speed signals. Therefore, the speed feedback control as well as the position feedback control are effected.

As a consequence, the cutter head 62 moves according to the NC data to machine the workpiece 63 to a contour according to the shape of the model 43 as it is or at a given magnification ratio.

While the tracer head is employed to effect a tracing process in the above description, a non-contact-type distance sensor may be employed in place of the tracer head.

In the above embodiment, the three control axes are provided for each of the tracing and machining processes. However, the present invention may be carried out with another number of axes.

With the present invention, as described above, while the model to be copied is being traced under the control of the tracing control circuit, the data are generated by the digitizing circuit with unwanted data eliminated, and the numerical control circuits control the machining axes in position according to the NC data. Therefore, the cutter head is prevented from biting into the workpiece, resulting in an increased degree of machining accuracy. In addition to tracing machining according to the shape of the model, various forms of data processing such as scaling, coordinate rotation, and the like can be carried out by the tracing control system. The tracing control system can therefore be used in an increased range of machining applications.

Since the tracing control circuit, the digitizing circuit, and the numerical control circuits are coupled to each other through the single bus, the tracing control system is smaller in size, less wasteful of functions, and more economic than a plurality of independent functional devices coupled together externally.

We claim:

1. A tracing control system for machining a workpiece using a cutter head to machine a desired contour corresponding to a surface of a model which is being traced, comprising:

a bus;

a tracing control circuit controlling a plurality of tracing axes to trace the surface of the model;

present position means for receiving positions of said plurality of tracing axes at periodic intervals and for providing the positions as positional data;

digitizing circuit means, connected to said tracing control circuit through said bus, receiving the positional data, comparing the positional data to a predetermined tolerable data when the positional data exceeds the predetermined tolerable value, and then generating NC data linearly approximating the surface of the model by processing the positional data, said digitizing circuit means includes processing the positional data according to at least one process of correcting an error of a path due to displacement of the stylus which traces the surface of the model, a process of scaling said positional data at a predetermined magnification ratio, a process of converting a unit of the positional data, and a process of rotating coordinates of the positional data and includes interpolating the positional data when the receiving of the positional data is interrupted to prevent the cutter head from biting into the workpiece without substantially affecting machining speed; and numerical control circuits, connected to said digitizing circuit means through said bus, positionally controlling machining axes corresponding to the tracing axes based on the NC data.

2. A tracing control system according to claim 1, wherein three control axes are respectively provided for said tracing axes and said machining axes.

* * * * *

UNITED STATES PATENT AND TRADEMARK OFFICE
CERTIFICATE OF CORRECTION

PATENT NO. : 5,283,509

DATED : February 1, 1994

INVENTOR(S) : Hitoshi MATSUURA et al.

It is certified that error appears in the above-identified patent and that said Letters Patent is hereby corrected as shown below:

Column 1, lines 29 and 30, after "displacement" (first occurrence) insert --and--; after "displacement" (second occurrence) change "and a" to --. A--.

Column 4, line 1, after "the" (second occurrence) insert --NC--;

line 34, after "tolerable" insert --value, interrupting the receiving of the positional--.

Signed and Sealed this

Sixteenth Day of August, 1994

Attest:

BRUCE LEHMAN

Attesting Officer     Commissioner of Patents and Trademarks